United States Patent
Adams et al.

[11] Patent Number: 4,639,584
[45] Date of Patent: Jan. 27, 1987

[54] NON-ALTERABLE MAGNETIC CODING

[76] Inventors: Robert T. Adams, 64 Great Hills Rd., Short Hills, N.J. 07078; Ronald Erickson, 1416 Morris Ave., Suite 3, Union, N.J. 07083

[21] Appl. No.: 758,695

[22] Filed: Jul. 25, 1985

[51] Int. Cl.$^4$ .................................. G06K 7/08
[52] U.S. Cl. .................... 235/449; 235/436; 235/493; 235/494
[58] Field of Search ............. 235/449, 493, 494, 462, 235/436; 360/2; 365/106

[56] References Cited

U.S. PATENT DOCUMENTS

| | | |
|---|---|---|
| 3,171,106 | 2/1965 | Lemmond . |
| 3,453,598 | 7/1969 | Schweizer . |
| 3,566,356 | 2/1971 | Holm et al. . |
| 3,788,617 | 1/1974 | Barney . |
| 3,803,634 | 4/1974 | Namikawa . |
| 3,860,796 | 1/1975 | Wallace et al. ............... 360/2 X |
| 3,874,586 | 4/1975 | Foote et al. . |
| 3,878,367 | 4/1975 | Fayling et al. . |
| 3,883,892 | 5/1975 | Kneller et al. . |
| 3,927,393 | 12/1975 | Fayling . |
| 3,986,205 | 10/1976 | Fayling . |
| 3,998,160 | 12/1976 | Pearce . |
| 4,023,204 | 5/1977 | Lee . |
| 4,180,837 | 12/1979 | Michaud . |
| 4,184,631 | 1/1980 | Lazzari ......................... 235/449 |
| 4,239,959 | 12/1980 | Gutterman . |
| 4,507,550 | 3/1985 | Fleer ............................ 235/449 |

FOREIGN PATENT DOCUMENTS 1308331  2/1973  United Kingdom .

Primary Examiner—David L. Trafton
Attorney, Agent, or Firm—Thomas Adams

[57] ABSTRACT

A card having an uninterrupted strip of magnetizable material affixed to the surface of a substrate can carry a machine readable code in the form of a magnetized pattern. By removing alternate magnetized segments, in a column of parallel rifts across the strip, the machines readable code becomes non-alterable, since a uniform, unidirectional magnetization of the remaining material restores the original code.

44 Claims, 13 Drawing Figures

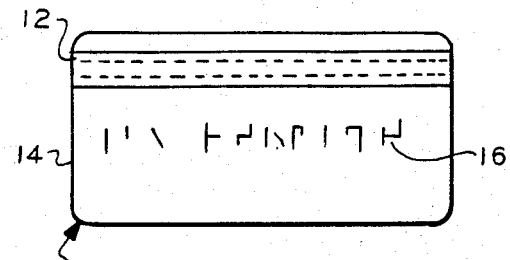
FIG. 1
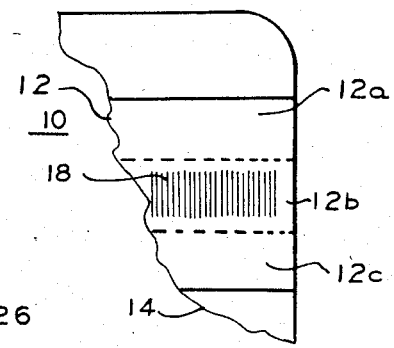
FIG. 2
FIG. 6
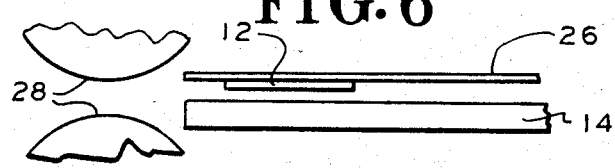
FIG. 7
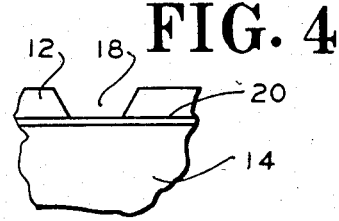
FIG. 4
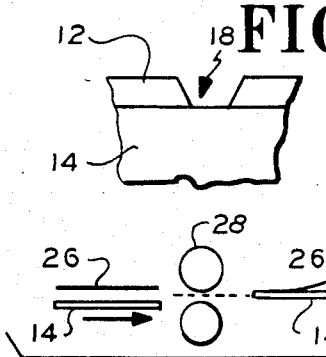
FIG. 3
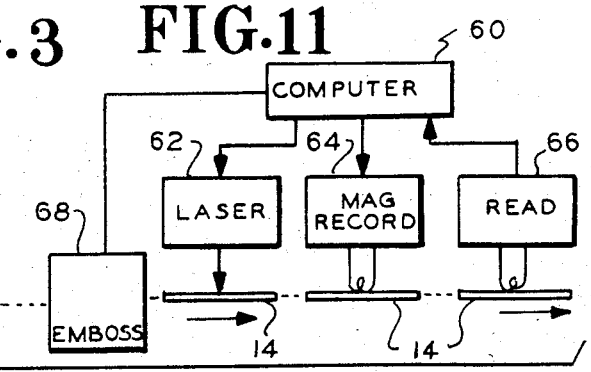
FIG. 11
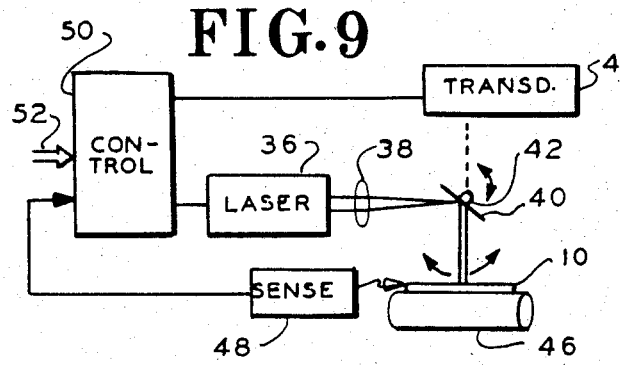
FIG. 9
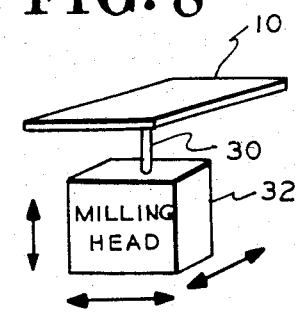
FIG. 8

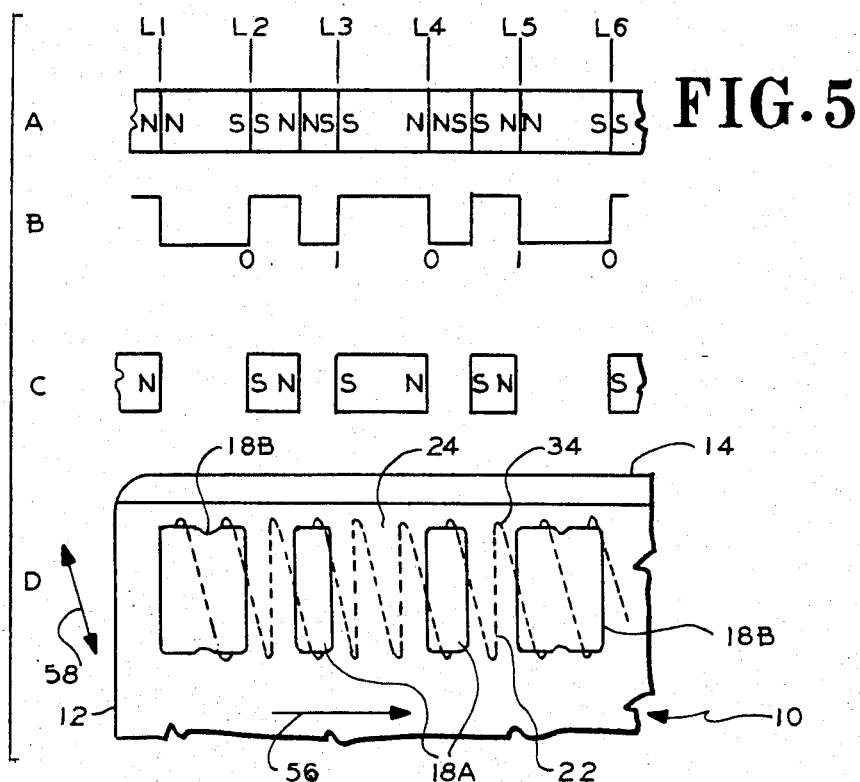
FIG. 5
FIG. 10
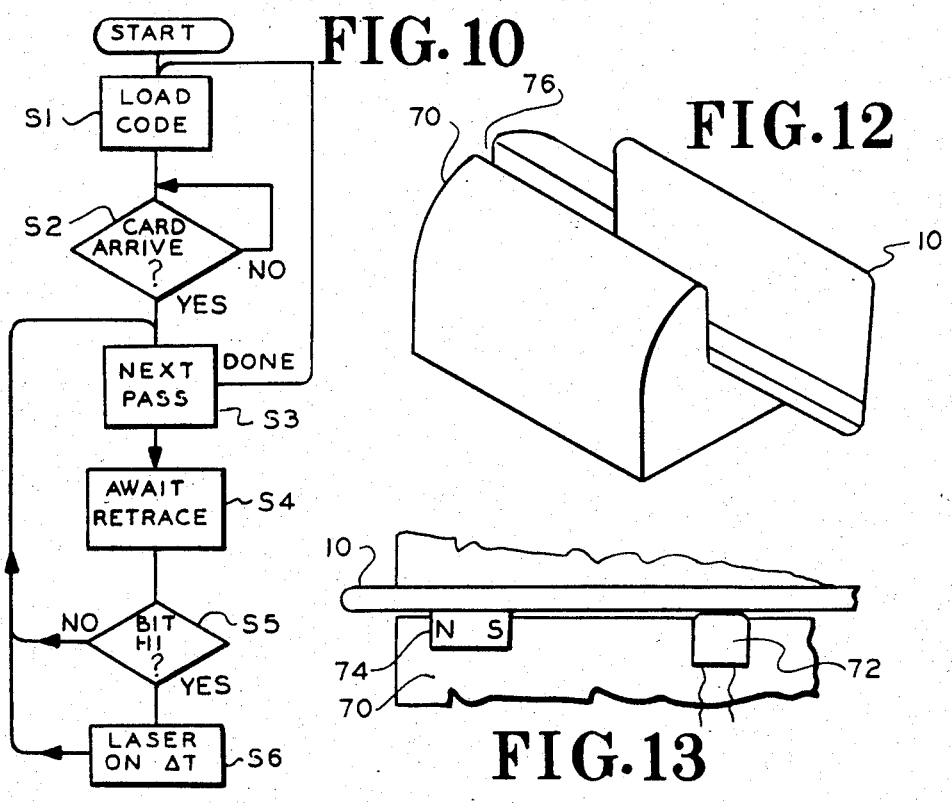
FIG. 12
FIG. 13

NON-ALTERABLE MAGNETIC CODING

BACKGROUND OF THE INVENTION

The present invention relates to cards carrying magnetic strips, and in particular, to a code strip having physical interruptions, together with methods and apparatus for making and using such cards.

Credits cards and bank identification cards are commonly manufactured with a rear stripe magnetically encoded with a phase modulation technique. The coding can represent the user indentification number. An important consideration in the personalization of these cards is ensuring that the magnetic code cannot be reproduced or altered by counterfeiters. The capital investment needed to produce counterfeit or altered cards should be prohibitively high. Unfortunately, the conventional magnetic strip can be re-encoded with a relatively modest investment, making it economically attractive for the counterfeiter.

A card can be erased accidentally by the card owner himself and no simple technique exists for restoring readability. Some card thieves can take advantage of this problem. The thieves may be concerned primarily with avoiding the step of having a stolen card read by a point-of-sale machine that verifies whether use of the card is permissible. By the simple expedient of passing a strong magnet near the stripe its magnetic code can be erased. Inattentive sales personnel may accept the card, assuming either an innocent erasure or that something is wrong with their card reading machine.

It has been proposed in the past to embed a series of separate magnetizable bars in a structure to represent an NRZ Code. However, this code has significant disadvantages. Furthermore, the concept of embedding separate magnetizable bars results in a structure that is difficult to manufacture, is not readable in existing machines, which are numerous and represent a large investment that will not be fully replaced. See U.S. Pat. No. 3,803,634.

Methods have been proposed to alternately magnetize a fluid medium which then parts at the transitions, due to the repelling magnetic forces, to form separate unmagnetized areas, which are then frozen. However, this system is difficult to manufacture, and has not proved suitable for producing various codes, such as phase modulaton. Also by requiring different magnetic orientations, additional complexity results. The pattern is not compatible with existing card readers.

Accordingly, there is a need for an improved magnetizable strip that is able to carry various codes, is readable in existing card readers, can encode individual card information—thus defeating mass use of stolen blank cards—, can have the encoded information easily restored to machine readability, and is secure from alternation and forgery. It is also desirable that any adjacent tracks carrying termpoary information (such as account balance) can still be read and re-written, in a form compatible with existing equipment.

SUMMARY OF THE INVENTION

In accordance with the illustrative embodiments demonstrating features and advantages of the present invention, there is provided a card for carrying a machine-readable code. The card has a substrate and an interrupted strip of magnetizeable material affixed to the substrate. The strip can be affixed by an embedding, lamination, deposition, coating, layering or other appropriate process. The interrupted strip has a column of parallel rifts arranged in a pattern bearing a predetermined relationship to the code. The magnetizeable material between each of the rifts is magnetized in the same direction.

A method according to the principles of the same invention can encode a magnetizeable strip affixed to a card. One step is cutting a plurality of parallel rifts along the length of this strip. Another step is magnetizing in the same direction the uninterrupted intervals between successive rifts.

It is preferred that both the rift intervals and the uninterrupted intervals are made to conform to successive magnetized intervals of the standard code.

Apparatus for practicing the foregoing method, also according to the principles of the present invention, can cut encoding rifts into a magnetizeable strip affixed to a card. The apparatus has a cutting means for cutting transverse rifts in the strip. Also included is a translation means for relatively moving the card longitudinally, with respect to the cutting means. Positioning of the rifts longitudinally along the card can be accomplished, for example, by moving the card or the cutting means, or by optically displacing a laser cutting beam, or by any combination of these. The apparatus has a control means, coupled to the cutting means for directing it to cut the rifts according to a predetermined pattern. Also included is a magnetic means for magnetizing the interval between the rifts, in the same direction.

Currently, most security features (finely detailed designs, holograms, etc) are added at the time of manufacture, making blank cards difficult to counterfeit, but providing no security against counterfeits made from stolen blanks. By the use of a rifted magnetic stripe for personalization and identification, most of the difficulty of counterfeiting occurs in simulating the identification, which is non-alterable thereafter. Thus stolen blanks are of relatively little value to a counterfeiter, and a personalized card, if stolen, loses most of its fraudulent value when the identification number is published in the stolen-card lists, since it cannot be used again with an altered number.

The foregoing card can be used with a card reader, according to the principles of the same invention, for reading mangetized intervals between rifts on a magnetizable strip. The reader has a magnetic sensor and a magnetizing means both mounted on a frame. The frame can guide the card longitudinally.

A preferred embodiment of the magnetic sensor is a conventional tape playback head, such as the heads presently used in magnetic readers for credit cards. The playback coil in such a head responds to the rate of change of flux in the head-gap, and thus a pulse is produced each time the head gap enters (or leaves) an interval of uniform magnetization, such as the magnetized intervals between rifts. The pulses produced on entering and leaving each interval are opposite in polarity, and the playback electronics of a digital reader conventionally extends these alternate positive and negative pulses into positive and negative intervals extending from one pulse to the next, thus reconstructing the original magnetic pattern.

(An alternate "Hall effect" head is available to sense magnetic field strength directly, rather than rate of change, in the form of transitions. Such heads are more costly and elaborate, and respond more slowly, and are not preferred.) The magnetizing means is positioned immediately preceding the magnetic sensor, and ensures that the inter-rift intervals are uniformly and fully magnetized before each reading. The magnetizing means must be disabled or removed whenever the reader is employed to read conventional un-rifted tracks of a credit card or other financial card.

The magnetic tracks of financial transaction cards, including credit cards, are defined by American National Standard ANSI X4.16-1983. There are three tracks defined (tracks 1, 2 and 3) and a fourth (track 0) is under consideration. Track 2 is presently designated to carry the account number (identification) and is not intended to be altered. Tracks 1 and 3 may be re-written in use (information such as user credit balance) and track 0, if adopted, is planned to carry further idnetification. The track construction and reading means covered in this summary described the application of non-alterable encoding to track 2, in accord with the present standards. Obviously, the same non-alterable encoding technique is applicable to any existing or proposed track or tracks for which a modified standard may call for non-alterable magnetic encoding. Track 2 is preferred, only in the sense of being in accord with present industry standards, and compatible with the presently used card readers, which represent a large investment.

The foregoing card can be used with existing card readers (ANSI standard), but those readers lack means for restoring machine readability by uniform unidirectional magnetization (e.g. Magnetization of Track 2, the central track of three).

The same card can first be re-magnetized by hand before reading. A DC electromagnet or a permanent magnet, suitable polarized, is moved along the length of track 2. The location remagnetized can be controlled by guiding from the card edge, and the width of the remagnetized interval can be controlled by the width of the pole pieces of the foregoing permanent magnet.

A new card-reader design, or a modification of existing card readers, can also be used to re-magnetize cards, immediately before reading, by means of a permanent magnet re-magnetizer attached so as to remagnetize the card strip at a point just prior to the read-head location. It will be important to avoid re-magnetizing cards of the type currently used, in which the information is carried solely as a pattern of magnetization, during the transition period (estimated several years) while both card styles are in use. The new card can be provided with a punched hole (or notched edge) which permits the remagnetizing magnet to come down in contact with the card stripe, while current un-punched cards will not be re-magnetized.

By using such a method and/or the card or apparatus associated therewith, a highly improved coding technique is achieved. In a preferred embodiment, a card has a magnetic strip cut by a number of parallel rifts. The width of each rift is either once or twice a standard width. Also, the spacing between the rifts in the preferred card is marked by an uninterrupted interval of either once or twice a standard width. A significant advantage is that such rifts may be so closely spaced as to prevent tampering or forgery.

On a preferred card, bits will be laid down at a density of 75 bits per inch. This density had been chosen as an industry standard for track 2 (identification track). The relatively low density maintains machine-readability even if the track suffers partial de-magnetization. Since the magnetization of the rifted track will be restored for each reading, a higher bit density can be supported (if the standard is altered) thus increasing the difficulty of forgery. However, to duplicate such a card, a forger would require relatively sophisticated and expensive, precision cutting equipment, an investment too great for profitable card forgery. Also, to counter such mechanical forgery it is proposed to apply a thin reflective material (e.g. aluminum metal) between the card and the strip. Thus mechanical cutting would damage the reflective material to expose tampering.

The preferred encoding technique employs phase modulation; wherein the interval between the rifts can be magnetized in the same direction. Thus, should the card lose its magnetization, it is simply remagnetized by a static magnetic field. Such remagnetization can be achieved in the field, or point of sale, by a relatively simple apparatus.

Significantly, the highly secure card described herein is compatible with existing credit and other cards employing phase modulation. While the absence of magnetizable material in the rifts causes a 6 db degradation in magnetic amplitude, this degradation does not prevent reading of the novel card with existing, point of sale equipment.

A preferred way of cutting the rifts in the magnetic strip is to employ a laser, having a beam reflected towards the card by a vibrating mirror. The preferred laser is pulsed on and off while the beam is scanned to cut single and double width rifts, and thereby produce the desired code. This laser encoding may be simply performed on a production line, where the card is successively embossed, laser cut, magnetically recorded, and then read back to double check the code accuracy.

The described card is arranged preferably to:

(1) Apply to the #2 ANSI strip (75 bits/inch, frequency modulation)

(2) Produce a non-alterable pattern that can be read by the existing card readers, which represent multiple million dollars investment by stores and businesses worldwide.

(3) Permit low-cost production and encoding at the current production rate of 1500 cards per hour, but requires a large investment which makes low-volume production very expensive (per card).

(4) Permit restoring the original code by remagnetization, as a low cost modification (or accessory add-on) to existing readers.

BRIEF DESCRIPTION OF THE DRAWING

The above brief description as well as other features and advantages of the present invention will be more fully appreciated by reference to the following detailed description of a presently preferred but nonetheless illustrative embodiment in accordance with the present invention when taken in conjunction with the accompanying drawings, wherein:

FIG. 1 is a back view of a card having a magnetic strip embedded therein, according to the principles of the present invention;

FIG. 2 is a detailed view of a fragment of the card of FIG. 1;

FIG. 3 is a cross-sectional view, showing in detail one of the rifts in the card of FIG. 2;

FIG. 4 is a detailed view of a fragment of the card of FIG. 1 showing an exposed foil laminate;

Figure 14:
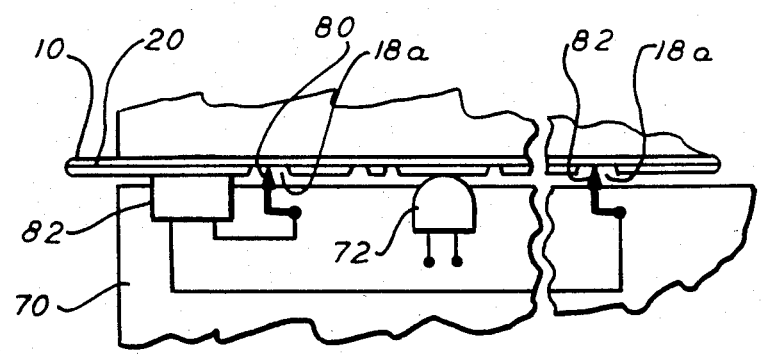

Instead of an underlying foil, the embodiment of FIG. 4 can employ a wire (not shown) affixed to run under the rifts and emerge exposed at each end of the track atop the substrate 14.

FIG. 5 is a phasing diagram, showing (A) the placement of magnetic segments for conventional phase modulation, (B) the magnetic signals associated therewith, as well as (C) the placement of magnetic segments in the card of FIG. 1 and (D) the pattern and physical location of rifts in the card of FIG. 1;

FIG. 6 is a side view of a rolling operation for manufacturing the card of FIG. 1;

FIG. 7 shows a stripping operation associated with the card manufactured by the operation of FIG. 6;

FIG. 8 is a schematic diagram of an apparatus for cutting rifts in the card of FIG. 1, according to the principles of the present invention;

FIG. 9 is a schematic diagram of a laser cutting apparatus, which is an alternate to that of FIG. 8;

FIG. 10 is a flow chart for the controller of FIG. 9;

FIG. 11 is is a schematic diagram showing various steps in the manufacture of the card of FIG. 1;

FIG. 12 is a perspective view of a card reader, according to the principles of the present invention;

FIG. 13 is a schematic diagram illustrating the operation of the card reader of FIG. 12.

FIG. 14 is a schematic diagram illustrating the operation of a card reader which is an alternate to that of FIG. 13.

DETAILED DESCRIPTION OF PREFERRED EMBODIMENT

The preferred embodiment described herein is chosen for compatibility with existing industry standards. As discussed in the Summary, further advantages can be derived if compatibility with existing card reading and card manufacturing equipment is sacrificed and the standards are revised.

Referring to FIGS. 1, 2 and 3, card 10 is shown having a magnetizable strip 12 mounted on a substrate 14. In this embodiment, card 10 may be in the form of a conventional credit card, having identifying characters 16 embossed onto substrate 14. Substrate 14 is a conventional thermoplastic substrate capable of being embossed with characters. In this embodiment, the magnetizable strip 12 is formed from $FeO_2$ or any comparable magnetic recording material into tracks 12a, 12b and 12c. For some embodiments, however, fewer or more tracks may be used. For tracks which are not protected against demagnetization by rifting, the use of high-coercivity materials can improve resistance to de-magnetization. Since the rifted magnetic track described here is re-magnetized for each reading, improved magnetic materials are not needed for rifted non-alterable tracks, but are useable.

For banking applications, tracks 12a and 12c can carry variable account information. Because they can change, these tracks should be non-permanent and are preferably of the conventional type, that is, uninterrupted. The center track 12b is formed with a column of parallel rifts 18. As shown most clearly in FIG. 3, rift 18 is a trapezoidal cut through the entire depth of strip 12, slightly into substrate 14. The width of rift 18 is preferably 0.0066 inch ±4%, or twice that amount. The sides of rift 18 form an angle of about 30 degrees with respect to the normal, although other angles may be cut, depending upon the cutting apparatus employed to form rift 18. In this embodiment, the thickness of strip 12 is approximately 0.005 inch, although clearly, other thicknesses are anticipated. The overall thickness of the card 10 is about 1/32 inch. Also, while open rifts are shown, these rifts may be filled with an intervening, neutral material, for example, plastic. Furthermore, the term rift does not necessarily imply mechanical removal of magnetic material since original placement of interrupted material is one possibility contemplated for some embodiments.

Referring to FIG. 4, a similar structure having a substrate 14 is embedded with a magnetic strip 12. However, this embodiment shows an aluminum foil sandwiched between strip 12 and substrate 14.

Referring to FIG. 5, a schematic diagram shows the relative placement of magnetic elements forming the code. FIG. 5d shows the strip 12 on the substrate 14, as a column composed of single width rifts 18A and double rifts 18B. The uninterrupted intervals between rifts 18A and 18B represent either a single width (0.0066 inch), such as interval 22, or a double width (twice as wide), such as interval 24. The width of interval 24 is about the same width as rift 18B, while the width of interval 22 is about the same as rift 18A.

In FIG. 5A, a conventional, phase modulation code is illustrated. The magnetic information constituting each bit of information is contained in an interval, having a standard length, the transition between each standard length being marked in FIG. 5A as transition L1–L6. In a typical application, there will be about 240 bits laid at a density of about 75 bits per inch. Therefore it will be appreciated that the diagrams of FIG. 5 are not to scale but distorted for ease of explanation.

The coding in FIG. 5A is phase modulation. At each transistion, L1–L6, a determination is made whether phase has reversed since the last transition. For example, unchanging phase would be one in which the magnetization stays the same except for a single reversal at each transition. An undisturbed phase is indicated at transition L2, since transition L2 marks the only magnetic reversal since transition L1. Such undisturbed phase change is interpreted as a zero bit. Thus, transition L2 is marked in FIG. 5B accordingly. However, between transition L2 and L3, a magnetic reversal occurs. Thus, the direction of change at transitions L2 and L3 is the same and, therefore, after transition L2 and L3, the magnetization direction is the same. Therefore, transition L2 is interpreted as a one bit.

It will be noted that the successive intervals in FIG. 5A are either a north-south magnetization, or a south-north magnetization. However, removal of magnetic intervals all having magnetization in one particular sense, does not destroy the information contained in the sequence.

Referring to FIG. 5C, the north-south magnetization intervals have been eliminated so that only those intervals with south-north magnetization remain. It will be noted that the phasing information still contains the same, digitized, encoded information as before.

The coding is such that a wide interval (either a double-width rift or a double width un-rifted interval) is taken as a binary "zero", while a pair of narrow intervals (one single-width rift and one single width un-rifted interval, in either order) is taken as a one. Narrow intervals are only created in pairs—a single narrow interval (or an odd number of successive narrow intervals) is a coding error.

Electrically, the head-gap of the playback head senses transitions of magnetization as pulses, and the recorded intervals of magnetization are recovered by processing in the playback electronics. In reading a conventional stripe, the magnetization reverses direction as the headgap passes from one interval into the next. In reading the rifted stripe discussed here, the magnetization varies between full magnetude and zero, at the same points, producing the same pulse pattern as the conventional stripe, but at reduced amplitude.

The pictured patterns of FIG. 5 show the coding patterns. Note that the binary value of each interval is shown (FIG. 5B) at the time when each value is determined (end of a wide interval or of a pair of narrow intervals). Thus, transition L3 designates a one bit. Essentially, the magnetic signal produced by the structure of FIG. 5C has the same phase relationship as FIG. 5A, except that the latter represents transitions between positive and negative amplitude, whereas the former represents transitions between zero and standard magnitude. In the situation of FIG. 5C, the amplitude swing is half that of FIG. 5A. Importantly however, this reduced amplitude swing is still sufficient that card readers adapted to reading cards as shown in FIG. 5A can still read the arrangement of FIG. 5C.

Referring to FIG. 5D, the rifts 18a and 18b are schematically illustrated. It will be understood that actual rifts will be much narrower and will be more closely spaced. However, this illustration was scaled for ease of understanding. The rifts will be either a single or double width: preferably 0.0066 inch and twice that width. Similarly, the uninterrupted intervals 22 and 24 will be either 0.0066 inch, or twice that amount. Preferably, the length of each of the rifts will be about 0.015 inch, approximately the same length as the width of the track containing the rift.

Referring to FIG. 6, it shows the way in which magnetizable strip 12 is embedded. Strip 12 is carried on a mylar carrier 26. The substrate 14 is overlaid with strip 12 and moved between opposing, heated, nip rollers 28. After being rolled in this fashion, the magnetic strip 12 is embedded in substrate 14, as illustrated in FIG. 7. Once so embedded, the mylar carrier 26 can be removed as illustrated, leaving an integral card structure.

Referring to FIG. 8, a cutting means for cutting rifts onto card 10 is illustrated as a milling bit 30, driven by a milling head 32, which is moveable in two coordinate directions to act as a translation means. Milling bit 30 is sufficiently narrow to cut a rift in the above-mentioned magnetizible strip 0.0066 inch in width. Milling head 32 is moved back and forth to cut successive rifts, and also in an out with respect to card 10, so that separate rifts are provided. Referring again to FIG. 5D, that pattern of rift cutting is illustrated on an exaggerated scale for illustrative purposes. The rifts 18A and 18B are overlaid with a sawtooth pattern shown by dotted lines 34. The dotted lines constitute those passes of the milling bit where it has been retracted from the card so no cutting occurs. It will be noted that certain passes are shown not by a dotted line, but by a rift. In this embodiment, double width right 18B is formed by two passes: The milling bit cuts transversely on the magnetic strip 12, is retracted therefrom, retraced to an adjacent position, and again thrust into magnetic strip 12 to cut a pass adjacent to that just laid. Therefore, by either cutting single passes or double passes, single or double width rifts can be provided. An example of a milling machine capable of producing such rifts as shown on FIG. 8 is a numerically-controlled milling machine, for example a series R2E4 milling machine for Bridgeport Machine Co., Bristol, Pa.

Referring to FIG. 9, an alternate apparatus for cutting rifts in a magnetic strip, is shown herein as a cutting means, comprising a laser 36 and various other associated apparatus. Laser 36 has its beam focused through lens 38 and reflected off vibrating mirror 40 to produce a beam B sized to produce a rift 0.0066 inch wide. This beam is not very sharply focused, since a laser beam can be narrowed significantly more. Laser 36 may be a YAG laser, with a 100 watt output. Laser 36 may be pulsed for the reasons described presently. Vibrating mirror 40 is pivotially mounted on axle 42 to reciprocate in the direction illustrated by the double-headed arrow. This vibration is caused by a transducer 44 in the form of a piezoelectric crystal. The card 10 is moved through beam B by a translation means shown herein as roller 46. Or course, other translation means may be used, such as a conveyor belt, card gripper, etc. The arrival of card 10 is sensed by as photo-optical sensor 48, preferably an LED transmitter and a conventional photo-optical transistor for receiving light reflected by card 10.

Overall system control is provided by a control means shown herein as microprocessor controlled device 50. Controller 50, laser 36, lens 38, transducer 44 and mirror 40, may be purchased as a package from JEC Laser of Saddlebrook, N.J., as Model #2500; computer based laser image system with 50W (CW) Nd: YAG laser (w 18M computer system). Controller 50 has a digital input on bus 52 that may come from a general purpose computer. This input on bus 52 may be successive codes which are to be cut into card 10 by laser 36.

To facilitate an understanding of the principles associated with the apparatus of FIG. 9, its operation will be described in connection with FIGS. 5 and 10. It will be appreciated, however, that the operation of the apparatus of FIG. 8 is similar. Before the arrival of card 10, the code for the next card is loaded into control means 50 along bus line 52 (FIG. 9), as indicated as step S1 in FIG. 10. It will be noted that the code thus loaded is in terms of a high or low bit for each pass of the laser beam B, indicating whether the laser should be on or off. Thus this code is spatial and is different representation than the code that would be obtained by reading the resulting rifts. Upon the arrival of card 10 at beam B, sensor 48 (FIG. 9) produces an output, which is applied to controller 50. The sensing of such an arrival is noted as step S2 of FIG. 10 which then allows execution of next step S3. At step S3, controller 50 (FIG. 9) is directed to produce the first bit of the sequence.

The first several passes will be blank passes where the laser does not turn on. For each pass, however, steps S4 and S5 are executed. In step S4, the computer awaits the completion of the last retrace (that is the return of the vibrating mirror 40 to a position at the beginning of a cut cycle. In step S5, the decision is made whether cutting is to occur. In this instance it is assumed that the code requires that no cutting be performed so that at step S5 the program returns to step S3.

Several of these blank cycles repeat until eventually a command to cut is received after a retrace. Accordingly, step S6 is excuted. Execution of step S6 keeps the laser on for a pulse interval equivalent to the time required for the beam to trace the full length of a rift. Thereafter, a new bit is loaded in step S3 and a retrace is awaited in step S4. If a double width rift is to be cut, then step S5 is succeeded by step S6 where another laser cut is performed. In a similar fashion, single and double width uninterrupted intervals can be left between rifts by one or two successive bits indicating that the laser will not be on.

This process is schematically illustrated, in exaggerated, in FIG. 5D. It should be noted that card 12 is moving in the direction indicated by arrow 56. A sawtooth scanning trace 34 is indicated on card 10, that is, linear segments either parallel to the width of the card or retrace scans at an angle thereto. This sawtooth wave is accomplished by reflecting the laser beam in the direction indicated by double-headed arrow 58. This direction is at an angle with respect to the width of the card and is chosen so that during the cutting trace perpundicular art is achieved. During retrace the net scan angle is greater than the angle of double-headed arrow 58. Thus the angle of trace 58 is chosen to compensate for the relative motion of the card 10.

When the entire code has been processed, such event is noted in step S3 which causes the program to shift to step S1 and await the loading of the next code.

The loading of these codes can be performed by general purpose computer 60 shown in FIG. 11. Computer 60 is shown directing laser cutter 62, which is that apparatus illustrated in FIG. 9. Computer 60 provides similar codes to magnetic recorder 64 and reads magnetically encoded information from read head 66. Recording head 64 and reading head 66 are conventional and is that apparatus used in existing production of credit cards with magnetic stripes on the back.

It will be appreciated that for those embodiments using an aluminum foil reflector as shown in FIG. 4A, the laser will reflect off foil 20. Accordingly, the laser cannot cut below the depth of foil 20 so that substrate 14 is never revealed. This feature is significant where a forger attempts to encode the card (or give the appearance of encoding) by mechanically cutting rifts. The cutting of rifts mechanically will almost certainly be imprecisely placed so that foil 20 is either not reached so that the rifts are dark or too deep so that substrate 14 is exposed. In either event the rifts will not exhibit an appropriate color and the forgery or the attempt to alter the code will be noticable.

Referring specifically to FIG. 11, the manufacture of cards is schematically illustrated. As described before, nip rollers 28 cause carrier 26 to embed its magnetic strip into substrate 14. Typically rollers 28 are heated and have a width equal to the desired width of the magnetic strip. After affixing, excess width of magnetic material can be stripped off. Also some processes laminate the magnetic material atop card 14 so they protrude in a non-flush manner. Thereafter carrier 26 is stripped from substate 14 and the remaining structure is supplied to an embosser 68. Embosser 68 is also driven by computer 60 which provides alpha-numeric codes indicating the specific characters to be embossed. After embossing, substrate 14 is moved past laser cutter 62 which performs in a manner previously described in connection with FIG. 9. Thereafter the magnetic strip is encoded by recording head 64. While a single head is shown, it will be appreciated that separate heads are provided for each track. For the rifts encoded by laser cutter 62, the head 64 need only provide a static field sufficient to magnetize the intervals between the rifts. Thereafter the magnetic information laid down by recording head 64 is played back by read head 66 to confirm that the information required by computer 60 has been accurately recorded.

Referring to FIGS. 12 and 13, an apparatus for reading the card 10 at a point of sale is illustrated. Before describing it, one should remember that card 10 can be also read by a conventional card reader existing at retail establishments today. Illustrated frame 70 contains magnetic sensor 72 of a conventional type. These last two components are commercially available and are used at the point of sale for reading the magnetically encoded information. An advantage of card 10 bearing the rifts described previously is that a conventional reader 70 can be used. As noted before, The rifts reduce the magnetic amplitude but does not change the encoding. Reader 70, however, has been modified to include a magnetizing means 74 in the form of a permanent magnet. Magnet 74 can be used to refresh the magnetization of the spaces between rifts 18 (FIG. 2). Accordingly, Magnet 74 needs to produce a narrow magnetic field affecting only the track having rift 18.

As usual, reader 70 is used by inserting card 10 in the slot 76 and quickly passing the card through the slot so that read head 72 produces a series of phase modulated pulses.

Referring to FIG. 14, it shows previously mentioned frame 70 modified to include contacts 80 and 82, acting as a continuity means. Contact 80 and 82 are leaf spring contacts having crimped free ends that fit through two extra wide rifts 18a to touch previously mentioned foil laminate 20 (although a wire could be used instead of a foil in some embodiments). The rifts 18a are placed at opposite ends of card 10. By making connection in this fashion continuity can be determined in the usual way. A continuous circuit formed in this fashion can illuminate (or extinguish) a light to indicate that the integrity of the underlying conductor has not been breached. Such a breach suggests that a forger tampered with the card by cutting rifts too deeply.

In this embodiment, however, such continuity causes the contacts 18a, connected to electromagnet means 82, to operate the latter. The continuity can, for example, cause a static magnetic field to emanate from electromagnetic means 82 long enough to magnetize card 10 as it passes through frame 70. Electromagnetic means 82 can employ the usual windings and can be positioned the same as previously illustrated permanent magnet 74. thus the electromagnet would be used to provide unidirectional magnetization of a rifted track only when it has an underlying conductor indicating the presence of a secure card.

The use of a reflecting foil or wire will force forgers to use a $50,000.00 laser instead of a $20,000.00 numerical milling machine. It is very hard to machine precisely through the oxide without removing the foil.

It is to be appreciated that various modifications may be implemented with respect to the above described preferred embodiments. For example, the width and the spacing of the various rifts can be altered. Furthermore, while the rifts are shown parallel to the width of the card, some embodiments may use angled rifts designed to work with angled reading heads. While the apparatus for cutting rifts operates in single width cutting passes, in some embodiments a cutting tool or a laser beam may be widened to cut in a single pass, a double width rift. It will also be understood that the length, width and thickness of the card can be altered depending on the environment. Also while phase modulation is disclosed in and other embodiments, pulse width, pulse position, frequency and other forms of modulation may be employed instead. Also while photo-optical sensing of card arriving at the laser cutter is noted, in other embodiments mechanical or other means of sensing card arrival is possible. Furthermore, in some embodiments, the synchronization of pulse cutting may be derived strictly from the card translation means which may have defined holding positions for cards. Also while a permanent magnet is shown as a refreshing device, in some embodiments an electromagnet may be used. Furthermore, the permanent magnet or electromagnetic may be used in a separate frame or in a hand held device used to refresh the magnetization of the card. Also, it will be understood that the flow chart showing the manner of decision making is exemplary and other decisions may be made in a different order within the scope of the present invention. Additionally, while a computer is intended to perform the cutting, in other embodiments direct typing of the codes may be possible without computer intervention.

Obviously, many modifications and variations of the present invention are possible in light of the above teachings. It is, therefore, to be understood that within the scope of the appended claims, the invention may be practiced otherwise than as specifically described.

What is claimed is:

1. A card for carrying a machine readable magnetic code, comprising:
    a non-magnetic substrate; and
    an interrupted strip of nonpermanently magnetizable material affixed to said substrate, said strip being several times thinner than said substrate, said strip having a column of parallel rifts, none of said substrate being in said rifts, said rifts and said magnetizable material between each of said rifts being arranged in a pattern bearing a predetermined relationship to said code, said magnetizable material between each of said rifts being magnetized in the same direction.

2. A card according to claim 1 wherein said pattern provides a digital, phase modulated format.

3. A card according to claim 2 wherein said rifts are divisible into single width and double width rifts, the latter being twice as wide as the former.

4. A card according to claim 3 wherein the uninterrupted intervals between adjacent ones of said rifts are divisible into single width and double width intervals, the latter being twice as wide as the former.

5. A card according to claim 4 wherein said strip has a predetermined thickness and wherein the depth of each of said rifts is approximately the thickness of said strip.

6. A card according to claim 1 further comprising:
    a reflective ribbon sandwiched between said substrate and said strip.

7. A card according to claim 1 wherein said substrate is embossed with a plurality of characters.

8. A card according to claim 7 wherein a portion of said characters bears a predetermined relationship to said code.

9. A card according to claim 8 wherein said substrate is plastic and said strip is oxidized iron.

10. A card according to claim 1 wherein the average number of rifts per inch along said column is between 20 to 250.

11. A card according to claim 10 wherein said average number of rifts per inch is between 35 to 80.

12. A card according to claim 1 wherein said strip is wider than said column of rifts.

13. A card according to claim 12 wherein said column of rifts lies in a first track parallel to at least a second track in said strip.

14. A card according to claim 12 wherein said second track is uninterrupted and magnetized into opposing successive segments.

15. A card according to claim 12 wherein said second track has encoded rifts.

16. A card according to claim 1 wherein said magnetizable material between each of said rifts is magnetized in a direction parallel to the length of said column.

17. A card according to claim 4 wherein said single and double width rifts are approximately the same width as said single and double width intervals, respectively.

18. A method of encoding a magnetizable strip affixed to a card, comprising the step of:
    affixing to said card said magnetizable strip at a thickness several times less than said card;
    forming a plurality of parallel rifts along the length of said strip, the rifts containing neither material from said card nor magnetizable material; and
    nonpermanently magnetizing in the same direction the uninterrupted intervals between successive ones of said rifts.

19. A method according to claim 18 wherein said rifts are formed into a pattern of single and double width rifts, the latter being twice as wide as the former.

20. A method according to claim 19 wherein successive ones of said rifts are separated by uninterrupted intervals, said uninterrupted intervals being classifiable as single width and double width intervals, the latter being twice as wide as the former.

21. A method according to claim 20 wherein said single and double width rifts are approximately the same width as said single and double width intervals, respectively.

22. A method according to claim 18 wherein said forming of said rifts comprises:
    scanning a laser beam across said strip to cut said rifts.

23. A method according to claim 22 further comprising the step of: moving said laser beam while holding said card stationary, said laser beam moving to an extent to allow forming of successive rifts on said strip without moving said card.

24. A method according to claim 22 further comprising the step of:
    moving said card past said laser beam, said beam being pulsed while scanning in a given direction to cut spaced rifts.

25. A method according to claim 24 wherein said laser beam when forming said rifts is scanned at an acute angle with respect to the direction of motion of said card to compensate for said motion.

26. A method according to claim 25 further employing a reflective ribbon, said method including the step of:
    sandwiching said reflective ribbon between said strip and said card, said cutting by said laser beam proceeding until said laser beam reflect from said reflective layer.

27. A method according to claim 18 further comprising the step of:
    embossing characters onto said card either before or after the cutting of said rifts.

28. A method according to claim 24 wherein said laser beam, on the average, is pulsed less frequently than once every scan cycle to develop an encoded pattern.

29. A method according to claim 28 wherein said laser beam is focused to a diameter to cause said laser beam when pulsed on successive scans to overlap, so that pulsing on alternate scans produces single width rifts and pulsing on two successive scans produces a double width rift.

30. A method according to claim 18 wherein each of said rifts are cut for less than the width of said strip.

31. A method according to claim 30 wherein said rifts are organized into a column occupying a first track, the method further comprising the step of:
   magnetizing a second uninterrupted track of said strip into successive opposing segments.

32. A method according to claim 18 further comprising the step of:
   remagnetizing the uninterrupted intervals between adjacent ones of said rifts.

33. A method according to claim 32 wherein said step of remagnetizing is performed by moving said strip through a static magnetic field.

34. Apparatus for forming encoding rifts onto a magnetizable strip affixed to a card, comprising:
   a cutting means for cutting transverse rifts in said strip;
   translation means for relatively moving said card longitudinally with respect to said cutting means;
   control means coupled to said cutting means for directing it to cut said rifts according to a predetermined pattern; and magnetic means for magnetizing the interval between said rifts in the same direction.

35. Apparatus according to claim 34 wherein said cutting means is operable to provide a scanned laser beam of an intensity sized to cut said strip.

36. Apparatus according to claim 35 wherein said control means is operable to pulse said beam on when it is scanning in a predetermined direction, said pulsing occurring according to a predetermined code.

37. Apparatus according to claim 36 wherein said laser beam is focused to a spot of a predetermined diameter on said strip, said cutting means being operable to scan said beam at a rate to illuminate successive intersecting areas.

38. Apparatus according to claim 37 wherein said control means is operable to double the width of one of said rifts by pulsing said beam on for two successive scans in said predetermined direction, whereby said control means is operable to produce single and double width rifts.

39. Apparatus according to claim 38 wherein said cutting means being coupled to said control means for receiving from it a vibration signal for controlling the vibration of said mirror.

40. Apparatus according to claim 39 wherein said mirror and transducer means are operable to scan said beam linearly and at an acute angle with respect to the direction of travel of said card caused by said translation means.

41. A card reader for reading magnetizable intervals between rifts on a magnetizable strip comprising:
   a frame for guiding said card longitudinally;
   a magnetic sensor mounted on said frame and positioned for sensing said magnetizable intervals and producing a pulse in response to the passage of each;
   a magnetizing means mounted on said frame and positioned alongside said sensor for magnetizing said magnetized intervals, whereby the magnetized intervals are refreshed; and
   state means for disabling said magnetizing means, said state means being operable to disable said magnetizing means if said magnetizable strip does not have rifts.

42. A card reader according to claim 41 wherein said strip covers a conductor exposed at both ends of said strip, said state means further comprising:
   continuity means for separately contacting said conductor at both ends of said strip and for providing a continuity signal in response to said conductor being continuous.

43. A card reader according to claim 42 where said magnetizing means comprises:
   a electromagnet means coupled to said continuity means for magnetizing said magnetized intervals in response to said continuity signal.

44. A method for refreshing and reading the magnetizable intervals between rifts on a magnetizable strip comprising the steps of:
   determining if said strip has rifts;
   applying, if said strip has rifts, a magnetizing unidirectional magnetic field to said magnetizable intervals between said rifts; and
   sensing the magnetization and size of said magnetizable intervals.

* * * * *